United States Patent [19]

Ueyama

[11] Patent Number: 4,812,865
[45] Date of Patent: Mar. 14, 1989

[54] CAMERA SYSTEM WITH INTERCHANGEABLE LENS UNIT

[75] Inventor: Masayuki Ueyama, Toyonaka, Japan

[73] Assignee: Minolta Camera Kabushiki Kaisha, Osaka, Japan

[21] Appl. No.: 85,177

[22] Filed: Aug. 14, 1987

[30] Foreign Application Priority Data

Aug. 18, 1986 [JP] Japan ................... 61-192400

[51] Int. Cl.⁴ ............................................. G03B 17/14
[52] U.S. Cl. .................................... 354/286; 350/257
[58] Field of Search ................ 354/286; 350/252, 257

[56] References Cited

U.S. PATENT DOCUMENTS 4,199,248  4/1980  Schlapp et al. ................ 354/286
4,548,488  10/1985  Honda et al. ................ 354/286 X

FOREIGN PATENT DOCUMENTS 53-66220  6/1978  Japan .

Primary Examiner—Michael L. Gellner
Attorney, Agent, or Firm—Burns, Doane, Swecker & Mathis

[57] ABSTRACT

The intermediate optical instrument or the like means is provided with false coupling prevention means by which a coupling connection of the intermediate instrument and the like means to interchangeable lens unit which is unsuitable for combined use said intermediate instrument and the like means.

27 Claims, 3 Drawing Sheets

FIG.6
FIG.2
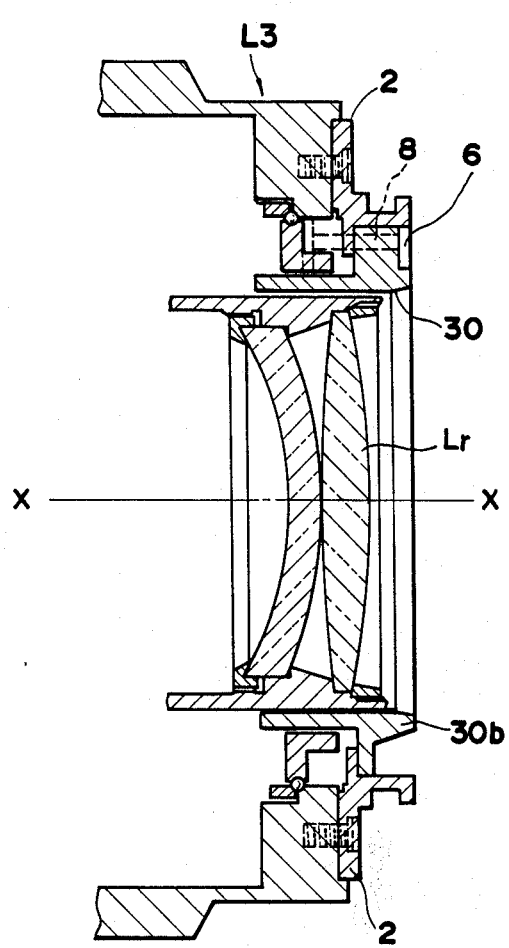
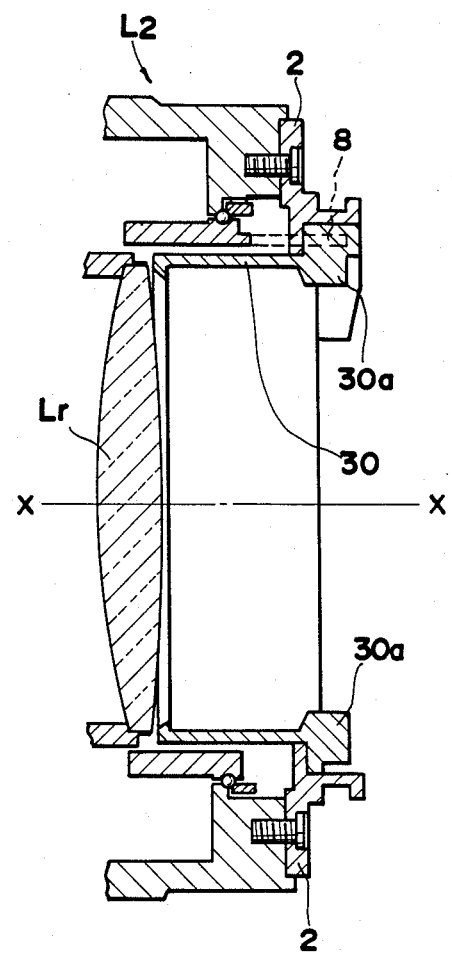

CAMERA SYSTEM WITH INTERCHANGEABLE LENS UNIT

BACKGROUND OF THE INVENTION

FIELD OF THE INVENTION

This invention relates generally to an improved camera system. More specifically, it relates to such improved camera system, as comprising at least a camera body and an interchangeable lens unit, and optionally further comprising the therebetween disengageably coupled rear converter, extension ring and bellows.

Description of Related Art

It is known that for the length-interchangeable, single lens reflex camera system, there are generally two different kinds of rear converters, more specifically those for long focal length lens units and short focal length lens units.

When rear converter for use with long focal length lens is so designed as to provide a high image resolution performance under combined use of a long focal length interchangeable lens unit, the rear conversion lens system mounted within the rear converter must be positioned at a relatively forward position. Thus, when the long focal length rear converter is coupled by error or accident with a short focal length lens unit, the lens of the short focal length lens unit and that in the rear converter may bring about a sudden mechanical collision with each other. Thus, when this coupling operation is carried out in a forced manner, lens breakage may be encountered at either or both coupling sides, which means naturally a detrimental defect.

Further, in the case of such an interchangeable lens unit, of which the rearmost lens member is shifted in zooming or focusing service, if, in this case, a false or improper rear converter should be coupled to it, a mechanical collision could occur between the rearmost lens of the interchangeable lens unit and the forwardmost lens of the rear converter during the execution of the operation for zooming or focusing.

Such modernized camera system are already known wherein the focal length information of the interchangeable lens unit, F-numbers and the like various information are stored in advance in a ROM provided in the interchangeable lens unit and some of them are read out therefrom and from the camera body side for use in exposure control or focus-detecting job. It has been further proposed that the rear converter used in this kind of camera system is designed and arranged in such a way that the information coming from the interchangeable lens unit is converted at the rear converter into that which corresponds to the combination of interchangeable lens unit and rear converter and then the thus converted ones are transmitted to the camera body side. Even in such a camera system as proposed above, since the precise information conversion within the rear converter can be carried out exclusively relative to such an interchangeable lens unit as is suitable for the rear converter in use, when other interchangeable lens units which are unsuitable for common use of the rear converter should be coupled to it, it could be frequently encountered that the correct and precise information corresponding to the specific combination of rear converter with the interchangeable lens unit now adopted could not be transmitted to the camera body side.

SUMMARY OF THE INVENTION

It is therefore an object of the present invention to provide such a camera system which is capable of preventing an improper coupling of an intermediate instrument or the like means with an interchangeable lens unit, when the combination of a rear converter or the like intermediate instrument with the interchangeable lens unit is improper.

Another object is to provide an intermediate instrument capable of being used for this purpose.

Still another object is to provide an improved interchangeable lens unit capable of use in the above purpose.

For fulfillment of the foregoing objects, main and characterizing features of the present invention reside in such an improved camera system wherein an intermediate optical instrument or the like means is capable of being inserted between an interchangeable lens unit and a camera body, wherein between an intermediate optical instrument to other interchangeable lens unit other than the said specifically selected one.

In the present invention, the intermediate optical instrument or the like means suitable for use with a specifically selected one of various interchangeable lens units and the specifically selected interchangeable lens unit per se, improper coupling proof means are provided for preventing an improper coupling of an intermediate optical instrument or the like means is provided with an improper coupling prevention means by which a coupling connection of the intermediate instrument, or the like means, to an interchangeable lens unit, which is unsuitable for combined use with the intermediate instrument, or the like means, is prevented.

Further, in the present invention, the interchangeable lens unit unsuitable for combined use with said intermediate instrument and the like means is provided with an improper coupling prevention means for inhibiting coupling connection of said intermediate instrument or the like means to said interchangeable lens unit.

Thus, it will be seen that according to this invention, it is possible to couple an intermediate optical instrument or the like means only when the combination of the interchangeable lens unit and the intermediate optical instrument or the like means is proper and allowable, while for improper combination between said both, the coupling therebetween is prevented physically.

These and further objects, features and advantages of the invention will be more fully understood as the description proceeds with reference to the accompanying drawings.

BRIEF DESCRIPTION OF THE DRAWINGS

In the following description, like parts are designated by like reference numerals throughout the several drawings.

FIG. 2 is an axial section of a further embodiment of the invention of an interchangeable lens unit per se which is unsuitable for combined use with a rear converter.

FIG. 6 is an axial section of an interchangeable lens unit as a further embodiment of the invention, unsuitable for combined use with the rear converter.

PREFERRED EMBODIMENTS OF THE INVENTION

In the following, preferred embodiments of the invention will be set forth in more detail and with reference to the accompanying drawings.

Figure 1:
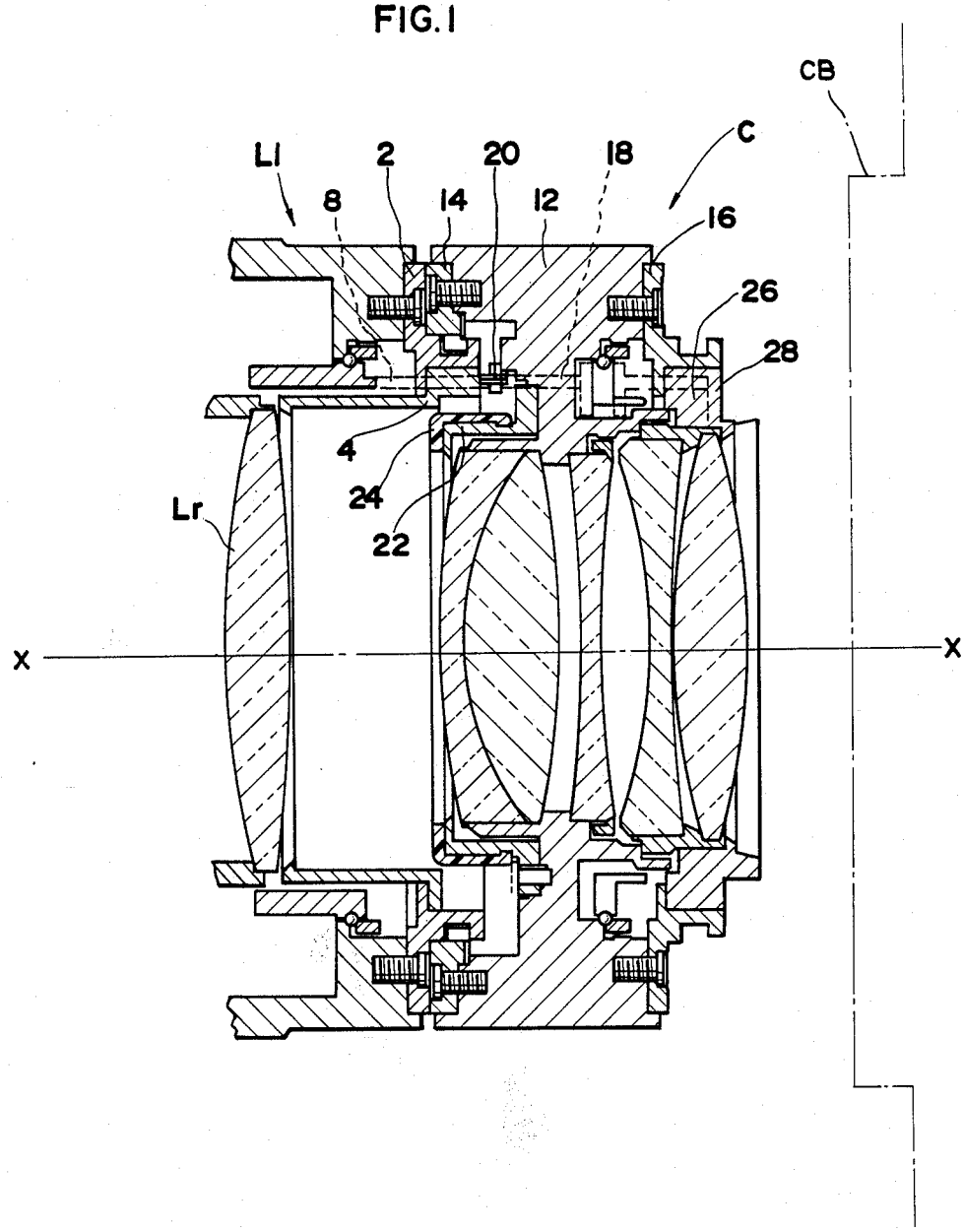
FIG. 1 is an axial section view of a preferred embodiment of the invention camera system wherein a preferred combination mode of an interchangeable lens unit with a rear converter suitable for use therewith is realized.

FIG. 1 shows a section view of a combination of a rear converter and an interchangeable lens unit suitable for use therewith, in a coupled arrangement mode as adopted in the present embodiment. FIG. 2 is a sectional view of an interchangeable lens unit unsuitable for use with the rear converter.

In FIG. 1, reference symbol L1 represents an interchangeable lens unit having a relatively long focal length; C a rear converter which is suitable for combination use with the above kind of long focal length lens unit.

Interchangeable lens unit L1 is provided with a male-mode mounting portion 2 to be fitted to the lens mount of the camera body, not shown, in the general and normal use thereof, more specifically under no combined use with the rear converter. At the inside of mounting portion 2, there is provided a shielding barrel 4. Symbol Lr represents the lens arranged at the most rear position in the range of interchangeable lens unit L1.

Figure 3:
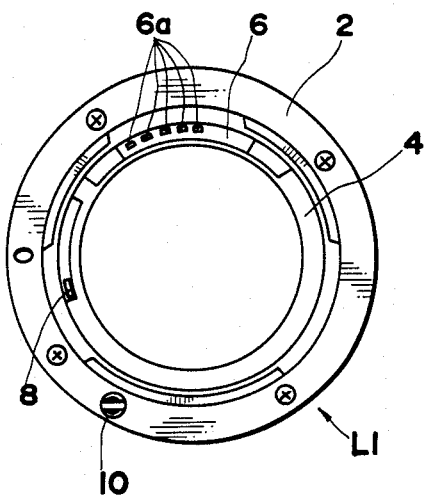
FIG. 3 is a rear view of the interchangeable lens unit per se shown in FIG. 1, as seen from the rear side, more specifically from the side of the rear converter.

FIG. 3 shows the interchangeable lens unit L1 as seen from the rear, more specifically from the rear converter side. In FIG. 3, numeral 6 represents a signal board fixedly attached to the shielding barrel 4. The signal board 6 is provided with a plurality of signal contacts 6a for transmitting information from a ROM, not shown, provided in the interchangeable lens unit L1 to the camera body side. 8 represents a diaphragm stop-down presetting level; 10 a focusing driven shaft for transmitting the drive force of a focusing motor, not shown, mounted in the camera body, serving for automatic focusing, as will be more fully described hereinafter.

Now, returning to FIG. 1, the rear converter C comprises a stationary barrel 12; a female-mode mounting portion 14 fixedly mounted thereon and adapted for tightly fitting to said male-mode mounting portion 2 of interchangeable lens unit L1 and a male-mode mounting portion 16 adapted for tightly fitting to the corresponding mounting portion, not shown, of the camera body, when necessary. It is to be noted that the male-mode mounting portion 16 of rear converter C has the same design configuration as the male-mode mounting portion 2 of interchangeable lens unit L1. The lens system of the rear converter C includes, as shown, a 4-group, 5-element structure and is firmly united together by means of a stationary barrel 12. Further, rear converter C is provided with a connection bar or the like means 18, which is adapted for establishing and holding connection between the camera body side aperture presetting level, not shown, and the interchangeable lens unit side aperture presetting lever 8, for transferring any aperture value preset at the camera body side to the stop-down mechanism, not shown, of the interchangeable lens unit L1. The stationary barrel 12 is attached fixedly a signal board 20 mounting a plurality of signal contacts 20b to be used in read-out of stored information from the ROM of the interchangeable lens unit L1, upon establishing respective contact with said contacts 6a at the side of the unit L1.

Numeral 22 represents a projecting member, formed preferably into a double-flanged barrel as shown, which is fixedly attached to stationary barrel 12 and serves as a first safety rigid means for preventing carelessly occurring false connection of the rear converter C to an unsuitable or originally unintended interchangeable lens unit. There is provided in front of the first safety means a second safety means formed into a collision-proofing buffer 24 which is made preferably from rubber of a like elastic material and help to avoid otherwise possible mechanical breakage in either or both related units or more specifically in the rear converter or the interchangeable lens unit, should the aforementioned kind of false connection have been carelessly or accidentally brought about.

Numeral 26 denotes a shielding barrel, preferably and practically in form of a ring, as shown, of the rear converter C. This shielding barrel 26 mounts fixedly a signal board 28, having a plurality of signal contacts, as before, which serve however, as part of such a system arranged and adapted for conversion of information read out from a ROM provided in the interchangeable lens unit, and for transmitting them to the camera body side.

Numeral 29 (FIG. 4) represents a connecting or intermediate shaft member which is to be coupled with a focusing-driven shaft 10 of interchangeable lens unit L1, for transmitting driving torque from the focusing motor arranged in the camera body to the driven shaft 10, the rear end thereof being connected to the focusing motor on the camera body.

Figure 4:
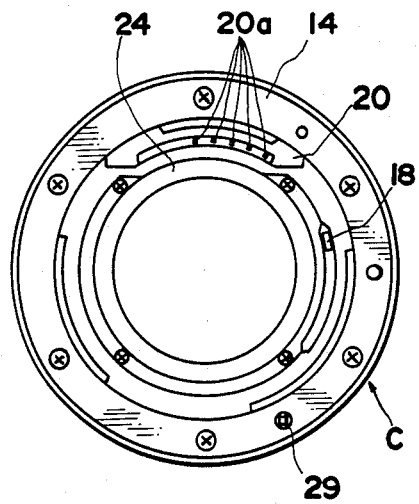
FIG. 4 is a front view of the rear converter shown in FIG. 1, as seen from the front side thereof, more specifically, from the side of the interchangeable lens unit.

In FIG. 4, a front view of the rear converter C, taken from the side of the interchangeable lens unit, is shown. From this FIG. 4, it will be easily seen that the respective signal contacts 20a on signal board 20 are brought into conductive contact with respectively arranged opposite contacts 6a when the rear converter is coupled with interchangeable lens unit L1.

Further, buffer member 24 and the projecting member of the rear converter C is formed into a closed circular ring arranged to be concentric to the optical axis X—X, as shown in FIG. 1 and as clearly illustrated in FIG. 4. As is shown in FIG. 1, since the interchangeable lens unit L1 which is suitable for combined use with the rear converter C, is fitted with no parts giving rise to sudden collision with the projecting member 22, a smooth fitting of the rear converter C to the interchangeable lens unit L1 is positively assured, and indeed, in reliance on the projecting member.

Figure 5:
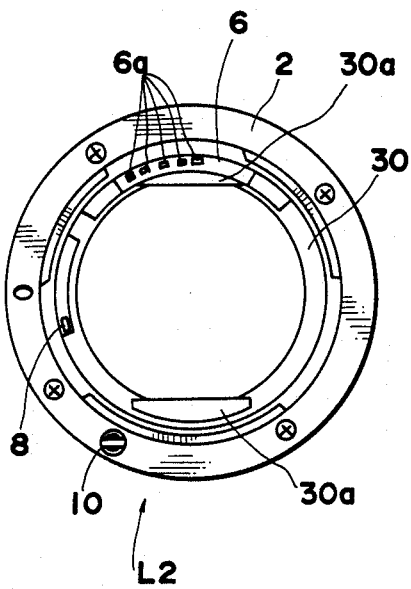
FIG. 5 is a rear view of the interchangeable lens unit shown in FIG. 2 as seen from the rear side, more specifically from the side of the rear converter.

However, in the case of a certain different interchangeable lens unit L2 which is unsuitable for use with the rear converter C, projecting portions 30a; 30a projecting in parallel to the optical axis X—X are made integral with, as shown, or provided separately on the shielding barrel 30 carrying signal board 6 to such a degree that when it is tried to fit onto the rear converter C, these projections 30a; 30a will contact the aforementioned projecting member 22. In FIG. 5, a view of the interchangeable lens unit L2, seen from the rear side or more specifically from the side of rear converter, is shown. It is seen therefrom that these projections 30a; 30a; are provided at the upper and lower portions of the barrel 30 in a mutually opposing arrangement to each other and extend laterally towards the both short side edges of the photographic image frame, not shown, and thus substantially in parallel to the upper and lower long side edges of the image frame.

Thus, when ti is tried to fit and couple the rear converter C to the interchangeable lens unit L2, which is unsuitable for combined use with the rear converter C, a contact between projection 22 formed thereon and projecting portions 30a; 30a on the lens unit L2 will inhibit the intended coupling. Even if it is tried to forcibly execute the aimed-at-coupling, the very presence of buffering means 24 between the related members of lens unit L2 and those of rear converter C will positively prevent otherwise possible occurrence of mechanical damage at one or more of these related members. In this way, an improper combined use of the rear converter by a careless operator can be prevented reliably in advance, and indeed, without invitation of mechanical breakage at the side of the interchangeable lens unit or rear converter side or the both.

In the present embodiment of the interchangeable lens unit L2, a pair of projections 30a; 30a, which inhibits an improper attachment of the rear converter C by contacting the projecting member 22 on the latter which is unsuitable for common use with the lens unit L2, is, when seen in general, arranged perpendicular to the short length edges of the photographic image frame, not shown. Such arrangement of these collision-inhibiting projections 30a; 30a is highly useful, especially in large aperture ratio lens unit, wherein wider fluxes of light are necessary to pass without obstacles in close proximity of the lens mount.

FIG. 6 represents an axial section of an interchangeable lens unit of a further embodiment of the invention. This interchangeable lens unit L3 is unsuitable as before in combined use with rear converter C.

Figure 7:
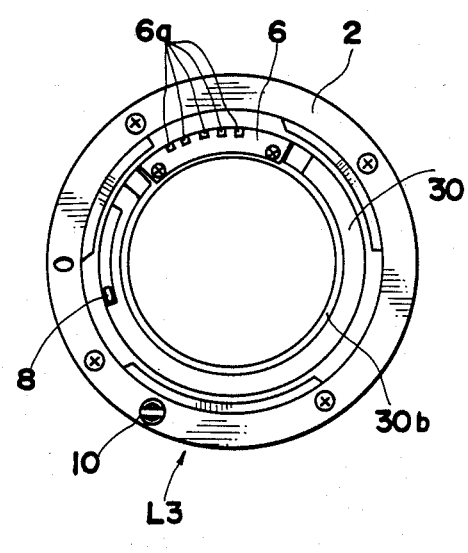
FIG. 7 is a rear view of the interchangeable lens unit of FIG. 6 from the rear side thereof, from the side of the rear converter.

In FIG. 7, the interchangeable lens unit L3 usable in the present embodiment of the invention is shown as viewing from rear or more specifically from the side of the rear converter. In this arrangement, a projecting portion 30b in form of a substantially annular flange, describing substantially a complete and concentric circumference around the optical axis X—X as the center, is formed on a shielding barrel 30, for the purpose of contacting the projecting member 22 of rear converter C. The present structure may be rather advantageously applied to a relatively small aperture ratio interchangeable lens unit.

If the above kind of interchangeable lens unit L3 should be tried, as per se and in the state shown in FIG. 6 without the projecting portion 30b, to attach with the rear converter C, an unavoidable and disadvantageous contact of the most rear-positioned lens Lr with the most front-positioned lens of rear converter C could be encountered. When, however, a focus ring, not shown, is so manipulated as to advance the lens Lr from the position shown in FIG. 6, the latter can be avoided from the contact said above with the lens of rear converter C. Even if, in the above state, the rear converter C could have been coupled to the interchangeable lens unit L3 without fear of interlens contact of the above kind, the focus ring may be manipulated again by the user so as to recede the lens Lr back to the position shown in FIG. 6, the latter lens Lr will be feared to collide against the lens of the rear converter C, possibly leading to physical breakage of either or both lenses. Therefore, even in the case of the present combination of the interchangeable lens unit L3 with the rear converter C, the invention should also be applied to, so as to avoid said kind of collision and breakage.

When the combination of the specific interchangeable lens unit with the rear converter is a suitable and recommendable one, the both units may preferably be coated at respective outer surfaces with a single and common color for identifying the capability of such an intercoupling. On the other hand, if the interchangeable lens unit is improper for combined use of this rear converter, the former is coated with a different color from the above so that at a glance it can be easily identified that the presently scheduled combination is unsuitable, while the same color shows the adoptability of the combination of the specific both units by a simple observation by the user.

Further, to avoid the use of two or more unit of the rear converter connected in series one after another simultaneously, provision may be had for similar projections such as at 30a or 30b as were adopted in the interchangeable lens unit L2 or L3, respectively, as set forth in the foregoing embodiment of the invention again on the camera side mount of the rear converter, inhibiting thereby an improper and careless attachment of the second rear converter, and as an optical and recommendable false-proof measure.

Although the foregoing embodiments and modifications, the gist of the invention was applied to rear converters which act to prolongate the focal length of the photographing optical system more predominantly than with the use of an interchangeable lens unit per se, and as an intermediate optical instrument or unit to be inserted between the interchangeable lens unit and the camera body, it should be noted that the invention should not be limited only thereto, and any other intermediate optical unit or instrument, such as, for instance, an extension ring or bellows to be inserted and coupled in position between the interchangeable lens unit and the camera body.

Although several illustrated embodiments with certain modifications of the present invention have been described in detail hereinbefore with reference to the accompanying drawings, it is to understood that the invention is not limited to these embodiments, and that various modifications and variations may be effected therein by one skilled in the art without departing from the scope and spirit of the invention as defined in the appended claims.

What is claimed is:

1. A camera system, comprising;
   a camera body;
   a first type of interchangeable lens unit having a first connecting member for detachably attaching the unit to the camera body;
   a second type of interchangeable lens unit having a second connecting member for detachably attaching the unit to the camera body;
   an intermediate optical instrument being suitable for use with the first type of lens unit and unsuitable for use with the second type of lens unit and having a third connecting member for detachably attaching the intermediate optical instrument to the first type of lens unit and so as to be insertable between the camera body and the first type of lens unit; and
   the second type of lens unit including means for preventing the second type of lens unit for being coupled with the intermediate optical instrument, said preventing means provided inside of the second connecting member so as not to interrupt the optical rays passing through the lens unit and not to interfere with the attachment of the second type of lens unit to the camera body.

2. The camera system of claim 1, wherein said intermediate optical instrument comprises second preventing means for preventing said second type lens unit from coupling with said intermediate optical instrument by interfering with said first preventing means.

3. The camera system of claim 2, wherein said intermediate optical instrument further comprises a lens holding frame, and the second preventing means is provided on the lens holding frame.

4. The camera system of claim 2, wherein said second preventing means includes an elastomeric annular projecting member.

5. The camera system of claim 1, wherein the preventing means is positioned at the upper part and the lower part of the photographic image frame.

6. The camera system of claim 1, wherein the optical instrument and the first lens unit are coated in a common color at outer surfaces thereof and the second lens unit is coated in a different color at an outer surface thereof.

7. The camera system of claim 1, wherein the preventing means includes a pair of projections extending radially inwardly from mutually opposing sides of said second connecting member.

8. An intermediate optical instrument for use with a camera body and a plurality of kinds of interchangeable lens units, said instrument comprising:
first means for coupling said instrument with said camera body;
second means for coupling one kind of said plurality of kinds of lens units with said instrument; and
means for preventing said instrument from coupling with an other kind of said plurality of kinds of lens units which is unsuitable for use with said instrument, said preventing means being positioned inside of said second coupling means so as not to interrupt the optical rays passing through the lens unit and the instrument and not to interfere with the attachment of the other kind of lens unit to the camera body.

9. The intermediate optical instrument of claim 8, wherein said preventing means comprises a projecting member for contacting another contact member formed in said other kind of lens unit.

10. The intermediate optical instrument of claim 8, further comprising a lens holding frame, wherein the preventing means is provided on the lens holding frame.

11. The intermediate optical system of claim 8, wherein the optical instrument and said one kind of said plurality of lens units are coated in a common color at the outer surfaces thereof and said other kind of lens units being coated with a different color at the outer surfaces thereof.

12. The intermediate optical instrument of claim 8, wherein said preventing means includes an elastomeric annular projecting member.

13. An interchangeable lens system for use with a camera body and an intermediate optical instrument inserted between the camera body and a lens unit of said system, said system comprising:
a first type of lens unit suitable for use with the instrument and having a first connecting member for detachably attaching the first type of lens unit to the camera body or the instrument;
a second type of lens unit having a second connecting member for detachably attaching the second type of lens unit with the camera body and being unsuitable for use with the instrument; and
means for preventing said second type of lens unit from coupling with said instrument, said preventing means provided inside of the second connecting member of said second type of lens unit so as not to interrupt the optical rays passing through the lens unit and the instrument and so as not to interfere with the attachment of the second type of lens unit to the camera body.

14. The interchangeable lens system of claim 13, wherein the preventing means is positioned at least at the upper part and the lower part of the photographic image frame.

15. The interchangeable lens system of claim 13, wherein the first type of the lens unit is coated in a common color to that of the optical instrument at outer surfaces thereof and the second type of lens unit is coated with a different color at outer surfaces thereof.

16. The interchangeable lens system of claim 13, wherein the preventing means includes a pair of projections extending radially inwardly from mutually opposing sides of said second connecting member.

17. An interchangeable lens unit for use with a camera body, comprising:
a connecting member for detachably attaching the lens unit with the camera body; and
means for preventing said lens unit from coupling with an intermediate optical instrument which is unsuitable for use with said lens unit, said preventing means being provided inside of the connecting member so as not to interrupt the optical rays passing through the lens unit and the instrument and not to interfere with the attachment of the lens unit to the camera body.

18. The interchangeable lens unit of claim 17, wherein the preventing means is positioned at least at the upper part and the lower part of the photographic image frame.

19. The interchangeable lens unit of claim 17, wherein said lens unit and said intermediate optical instrument are color coded to indicate that the intermediate optical instrument is unsuitable for use with the lens unit.

20. The interchangeable lens system of claim 17, wherein the preventing means includes a pair of projections extending radially inwardly from mutually opposing sides of said connecting member.

21. An optical system for use with a camera body, comprising:
a first type of interchangeable lens unit detachably attachable to the camera body,
a second type of interchangeable lens unit having a first connecting member for detachably attaching the unit to the camera body;
an intermediate optical instrument suitable for use with the first type of lens unit and unsuitable for use with the second type of lens unit and having a second connection member for detachably attaching the instrument to the first type of lens unit so as to be insertable between the camera body and the first type of lens unit; and
the second type of lens unit including means for preventing the second type of lens unit from coupling with the instrument, said preventing means provided inside of the first connecting member so as not to interrupt the optical rays passing through the lens unit and not to interfere with the attachment of the second type of lens unit to the camera body.

22. The optical system of claim 21, wherein said optical instrument comprises second preventing means for preventing said second type of lens unit from coupling with said instrument by interfering with said preventing means.

23. The optical system of claim 25, wherein the optical instrument includes a lens holding frame and the second preventing means is provided on the lens hold frame of the optical instrument.

24. The optical system of claim 25, wherein said second preventing means includes an elastomeric annular projecting member.

25. The optical system of claim 21, wherein the preventing means is positioned at least at the upper part and the lower part of the photographic image frame.

26. The optical system of claim 21, wherein the optical instrument and the first lens unit are coated in a common color at outer surfaces thereof and said second lens unit is coated in a different color at an outer surface thereof.

27. The optical system of claim 21, wherein the preventing means includes a pair of projections extending radially inwardly from mutually opposing sides of said connecting member.

* * * * *